United States Patent
Sgarz et al.

(10) Patent No.: US 12,532,060 B2
(45) Date of Patent: Jan. 20, 2026

(54) SENSOR DEVICE AND INSPECTION CAMERA HAVING SUCH A SENSOR DEVICE

(71) Applicant: Robert Bosch GmbH, Stuttgart (DE)

(72) Inventors: Heiko Sgarz, Leonberg (DE); Frank Huembert, Stuttgart (DE); Jan-Michael Brosi, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 18/055,741

(22) Filed: Nov. 15, 2022

(65) Prior Publication Data
US 2023/0164418 A1   May 25, 2023

(30) Foreign Application Priority Data
Nov. 19, 2021 (DE) .................. 10 2021 213 018.6

(51) Int. Cl.
*H04N 23/50* (2023.01)
*G02B 23/24* (2006.01)
*G02B 23/26* (2006.01)
*H04N 23/51* (2023.01)
*H04N 23/56* (2023.01)

(52) U.S. Cl.
CPC ....... *H04N 23/555* (2023.01); *G02B 23/2461* (2013.01); *G02B 23/2484* (2013.01); *G02B 23/26* (2013.01); *H04N 23/51* (2023.01); *H04N 23/56* (2023.01)

(58) Field of Classification Search
None
See application file for complete search history.

(56) References Cited

U.S. PATENT DOCUMENTS

| | | |
|---|---|---|
| 8,218,074 B2 | 7/2012 | Pease et al. |
| 2012/0088965 A1 | 4/2012 | Stokes et al. |
| 2013/0242071 A1 | 9/2013 | Wada et al. |
| 2016/0143519 A1* | 5/2016 | Harris .............. A61B 1/227 600/188 |
| 2017/0245741 A1 | 8/2017 | Valdastri et al. |
| 2021/0219822 A1* | 7/2021 | Ohno ............... A61B 1/00105 |

FOREIGN PATENT DOCUMENTS

| | | |
|---|---|---|
| DE | 11 2019 004 890 T5 | 6/2021 |
| DE | 10 2020 111 886 A1 | 11/2021 |
| JP | 2002-263057 A | 9/2002 |
| KR | 10-0921656 B1 | 10/2009 |
| WO | 2014/203604 A1 | 12/2014 |

* cited by examiner

*Primary Examiner* — Samira Monshi
(74) *Attorney, Agent, or Firm* — Maginot, Moore & Beck LLP

(57) ABSTRACT

A sensor device, in particular a sensor head, for an inspection camera, in particular an endoscope, has at least one illumination unit for illuminating an examination object. The sensor device further has at least one camera unit for detecting the examination object. In addition, the sensor device has at least one housing unit in which the camera unit and the illumination unit are arranged. The housing unit is designed to taper along a longitudinal axis of the housing unit.

16 Claims, 4 Drawing Sheets

SENSOR DEVICE AND INSPECTION CAMERA HAVING SUCH A SENSOR DEVICE

This application claims priority under 35 U.S.C. § 119 to patent application no. DE 10 2021 213 018.6, filed on Nov. 19, 2021 in Germany, the disclosure of which is incorporated herein by reference in its entirety.

BACKGROUND

U.S. Pat. No. 8,218,074 B2 has already proposed a sensor device, in particular a sensor head, for an inspection camera, in particular for an endoscope, having at least one illumination unit for illuminating an examination object, having at least one camera unit for detecting the examination object, and having at least one housing unit in which the camera unit and the illumination unit are arranged.

SUMMARY

The disclosure proceeds from a sensor device, in particular a sensor head, for an inspection camera, in particular for an endoscope, having at least one illumination unit for illuminating an examination object, having at least one camera unit for detecting the examination object, and having at least one housing unit in which the camera unit and the illumination unit are arranged.

It is proposed that the housing unit is designed to taper along a longitudinal axis of the housing unit. The sensor device is in particular designed to detect, without destruction, examination objects that are difficult to access or inaccessible for a person. The examination object is, for example, an inner wall of a tube, a cavity, a rear wall of a fixedly installed device, an internal organ, in particular a digestive tract, of a living being, or the like. With respect to the longitudinal axis, the housing unit preferably comprises a front housing portion and a rear housing portion. The sensor device is in particular provided to be introduced, in particular inserted, into the examination object with the front housing portion first. The housing unit in particular comprises at least one cable pass-through arranged on the rear housing portion. The cable pass-through is provided in particular for receiving a cable unit of the inspection camera. The cable unit in particular connects the camera unit and/or the illumination unit to a power source of the inspection camera. The cable pass-through is preferably provided to align a central axis of the cable unit at the cable pass-through in parallel to the longitudinal axis of the housing unit. In particular, the cable pass-through is provided to concentrically align the cable unit and the housing unit with respect to the longitudinal axis.

On an outer side, the housing unit comprises at least one slanted surface which forms a tapering of the housing unit relative to the longitudinal axis. The slanted surface and/or a tangential plane of the slanted surface in particular enclose/encloses an acute angle with the longitudinal axis. The slanted surface may be arranged in the front housing portion, in the rear housing portion, and/or between the front and rear housing portions. The slanted surface may be flat or curved, in particular rotationally symmetrical with respect to the longitudinal axis. For example, a part of the housing unit, in particular the front housing portion and/or the rear housing portion, or the entire housing unit is conical, frustoconical, pyramidal, frustopyramidal, wedge-shaped, rotationally hyperboloidal, rotationally paraboloidal, spherical, hemispherical, or the like. The housing unit may taper continuously or in multiple stages. If both the front housing portion and the rear housing portion form a taper, these tapers may taper in the same direction or in opposite directions along the longitudinal axis of the housing unit. The housing unit preferably has a maximum longitudinal extension parallel to the longitudinal axis, in particular along the longitudinal axis. Preferably, the housing unit has a maximum transverse extension perpendicular to the longitudinal axis and a minimum transverse extension different from the maximum transverse extension. In particular, the slanted surface connects the maximum transverse extension to the minimum transverse extension. The maximum transverse extension may be arranged in the front housing portion, in the rear housing portion, and/or between the front and rear housing portions. The minimum transverse extension is preferably arranged in the front housing portion or in the rear housing portion, in particular at one end of the housing unit along the longitudinal axis. The maximum longitudinal extension may be greater or less than the maximum transverse extension and/or the minimum transverse extension.

The slanted surface extends in parallel to the longitudinal axis, preferably over a substantial part of the maximum longitudinal extension of the housing unit. The term "substantial part" of a reference length is to be understood in particular to mean at least 15%, preferably more than 25%, particularly preferably more than 33%, optionally more than 50%, of an overall length of the reference length. A minimum transverse extension is preferably less than the maximum transverse extension by at least 1%, preferably more than 3%, particularly preferably more than 5%, of the maximum transverse extension. In at least one embodiment, the minimum transverse extension is in particular quasi-punctiform and forms, for example, an apex of a curvature or of a tip. In an alternative embodiment, the minimum transverse extension is a maximum extension of a front surface of the housing unit, in particular of the front housing portion, which is in particular perpendicular to the longitudinal axis.

The camera unit and the illumination unit are in particular arranged inside the housing unit. The housing unit in particular comprises a contiguous outer housing, which forms the taper and in which the camera unit and the illumination unit are arranged together. Optionally, the housing unit comprises at least one structural element, which divides an interior space of the outer housing into a plurality of subspaces. The outer housing may be formed from one piece or may be composed of a plurality of mounting part housings, in particular mounting half shells. In particular, the housing unit comprises at least one illumination opening through which the illumination unit can illuminate the examination object. Alternatively or additionally, the housing unit is at least partially formed from a light-transmissive material, in particular from a transparent or translucent material. The housing unit preferably comprises at least one camera opening for passing light through the housing unit toward the camera unit. The camera unit in particular comprises at least one camera element, optionally a plurality of camera elements. Preferably, the at least one camera element is designed as a photodetector, in particular as an active pixel sensor (CMOS sensor) or a charged-coupled device sensor (CCD sensor). The illumination unit preferably comprises at least one illumination element, and particularly preferably at least one further illumination element. Preferably, the illumination unit comprises at least one inorganic or organic light-emitting diode (LED, OLED) as the illumination element and/or as the further illumination element. In an advantageously compact embodiment, the illumination unit and the camera unit comprise a common printed circuit board on which the at least one camera element and the at least one illumination element are arranged. Alternatively, the illumination unit and the camera unit are formed separately from one another and in particular are arranged at a distance from one another within the housing unit, in particular on different printed circuit boards.

As a result of the embodiment according to the disclosure of the sensor device, the sensor device can advantageously be easily moved within the examination object. In particular, a sliding movement of the sensor device within the examination object may be advantageously supported. In particular, a risk of the sensor device getting caught and/or stuck within the examination object can advantageously be kept small. In particular, a risk of damaging the sensor device and/or the examination object may be advantageously kept small.

It is furthermore proposed that with respect to the longitudinal axis, the housing unit comprises a front housing portion, in particular the one already mentioned, a rear housing portion, in particular the one already mentioned, and a cable pass-through, in particular the one already mentioned, arranged on the rear housing portion, for connecting the camera unit and/or the illumination unit to a power source, in particular the one already mentioned, of the inspection camera, wherein the front housing portion is designed to taper along the longitudinal axis in a direction facing away from the rear housing portion. Along the longitudinal axis, the front housing portion in particular ends with the minimum transverse extension. In planes perpendicular to the longitudinal axis, along the longitudinal axis, the rear housing portion may have a constant transverse extension, in particular the maximum transverse extension of the housing unit, or may have a variable transverse extension. As a result of the embodiment according to the disclosure, a risk of getting caught when introducing the sensor device into the examination object can advantageously be kept small.

Furthermore, it is proposed that the housing unit is asymmetrical with respect to a center plane that is parallel to the longitudinal axis and goes through a geometric center of gravity of the housing unit. In particular, the housing unit comprises at least one housing wall extending in parallel to the longitudinal axis. In particular, the slanted surface and the housing wall parallel to the longitudinal axis are opposite one another with respect to the center plane. Alternatively, the housing unit comprises at least one further slanted surface as an outer wall, which is opposite the slanted surface with respect to the center plane. For example, the further slanted surface or a tangential plane of the further slanted surface encloses with the longitudinal axis a further acute angle, which is different from the acute angle between the slanted surface or the tangential plane of the slanted surface and the longitudinal axis. Alternatively, the slanted surface is curved and the further slanted surface is flat, or the slanted surface is flat and the further slanted surface is curved. As a result of the embodiment according to the disclosure, a deflection of the sensor device around a corner or bend within the examination object can be advantageously supported at least in one direction. In addition, an advantageously large interior space within the housing unit can be maintained at the same time.

Furthermore, it is proposed that an edge of the housing unit delimiting a cable pass-through, in particular the one already mentioned, of the housing unit has a maximum transverse extension, perpendicular to the longitudinal axis, in particular the maximum transverse extension already mentioned, of the housing unit in a plane perpendicular to the longitudinal axis. In particular, the maximum transverse extension of the housing unit is insignificantly greater than a maximum opening width of the cable pass-through. The term "insignificantly greater" is to be understood in particular to mean greater by less than three times a maximum material thickness of the housing unit, preferably by less than two times a maximum material thickness of the housing unit, in particular by at most one time a maximum material thickness of the housing unit. Preferably, the maximum transverse extension of the housing unit is at least substantially equal to a maximum cable transverse extension of the cable unit. The term "substantially equal" is to be understood in particular to mean equal with a deviation of less than 10%, preferably less than 5%, in particular less than 3%. In particular, the cable pass-through is provided to arrange the cable unit and the housing unit at least substantially flush with one another, in particular to arrange them next to one another perpendicularly to the longitudinal axis with an offset of less than 1 mm, preferably less than 0.5 mm. As a result of the embodiment according to the disclosure, a shoulder between the cable unit and the sensor device can advantageously be avoided. In particular, a risk of getting caught when the sensor device is removed from the examination object may advantageously be kept small.

It is furthermore proposed that with respect to the longitudinal axis, the housing unit comprises a front housing portion, in particular the one already mentioned, a rear housing portion, in particular the one already mentioned, and a cable pass-through, in particular the one already mentioned, arranged on the rear housing portion, for connecting the camera unit and/or the illumination unit to a power source, in particular the one already mentioned, of the inspection camera, wherein the rear housing portion is designed to taper along the longitudinal axis in a direction facing away from the front housing portion. In particular, the rear housing portion has a minimum rear transverse extension in a plane which is perpendicular to the longitudinal axis and in which the cable pass-through is arranged. The minimum rear transverse extension may be identical to, equal to, or different from the minimum transverse extension of the entire housing unit. The minimum rear transverse extension is in particular greater than the maximum opening width of the cable pass-through. The minimum rear transverse extension is preferably less than the maximum transverse extension of the housing unit. In particular, the housing unit widens, in particular continuously, starting from the cable pass-through along the longitudinal axis up to the maximum transverse extension. In planes perpendicular to the longitudinal axis, along the longitudinal axis, the front housing portion may have a constant transverse extension, in particular the maximum transverse extension of the housing unit, or may have a variable transverse extension. As a result of the embodiment according to the disclosure, a shoulder between the cable unit and the sensor device can advantageously be avoided. In particular, a risk of getting caught when the sensor device is removed from the examination object may advantageously be kept small.

Furthermore, it is proposed that the sensor device comprises at least one protective window, closing the housing unit, for protecting the camera unit and at least one further protective window for protecting the illumination unit, wherein the protective window and the further protective window are formed separately from one another. The protective window is in particular arranged in the camera opening of the housing unit. The protective window is preferably made of a transparent material. The further protective window is in particular arranged in the illumination opening. The further protective window may be made of a transparent or translucent material. The camera opening and the illumination opening of the housing unit may be integrally formed, in particular forming a single opening or may be arranged at a distance from one another. The protective window preferably comprises a camera surface facing the camera unit, an object surface provided to face the examination object, and at least one side wall connecting the camera surface and the object surface to one another. The further protective window preferably comprises an illumination surface facing the illumination unit, a further object surface provided to face the examination object, and at least one further side wall connecting the illumination surface and the further object surface to one another. The protective windows may optionally be designed as optical lenses. Preferably, the sensor device comprises at least one blocking element arranged on the side wall of the protective window and/or on the side wall of the further protective window, in particular between the protective windows. The blocking element is in particular made of a non-light-transmissive material. The blocking element is in particular provided to block internal housing light from the illumination unit, in particular by absorption and/or reflection. In particular, the blocking element is provided to block internal housing light from being coupled from the illumination unit into the camera unit. The term "internal housing light" is in particular to be understood to mean light that is generated within the housing unit and, without leaving the housing unit, can be detected by the camera unit, in particular as scattered light, in particular in contrast to light that is emitted or reflected by the examination object. The blocking element is preferably designed as a structural element, in particular a spacer, of the housing unit. Alternatively, the blocking element is designed as a film or coating applied to the side wall and/or the further side wall. As a result of the embodiment according to the disclosure, an amount of light of the illumination unit that has not interacted with the examination object and impinges on the camera unit can advantageously be kept small. In particular, conduction of the light from the further protective window to the protective window can advantageously be kept small.

In addition, it is proposed that the protective window and the further protective window are arranged at an offset from one another in a direction parallel to the longitudinal axis. The protective window in particular has a maximum window thickness between the camera surface and the object surface. The further protective window in particular has a further maximum window thickness between the illumination surface and the further object surface. Preferably, the protective window and the further protective window are arranged in parallel to the longitudinal axis at an offset of more than the maximum window thickness, in particular more than two times the maximum window thickness, and/or more than the further maximum window thickness, in particular more than two times the further maximum window thickness. The protective window that is arranged closer to, in particular on, the longitudinal axis, is preferably offset in the direction of the front housing portion, while the protective window that is arranged further away from the longitudinal axis is offset in the direction of the rear housing portion. The front housing portion can advantageously be strongly tapered as a result of the embodiment according to the disclosure.

It is furthermore proposed that a viewing direction of the camera unit is oriented at an acute angle, in particular an adjustable acute angle, to the longitudinal axis in order to detect the examination object through a slanted surface, in particular the one already mentioned, of the housing unit tapering the housing unit. The viewing direction is in particular a central axis of a maximum viewing angle of the camera unit, in particular of the camera element. In one embodiment of the camera unit having a plurality of camera elements, each camera element preferably has its own viewing direction, which may be oriented in parallel to one another, arranged in a common viewing plane, or arranged obliquely to one another. The viewing direction of the at least one camera element is preferably oriented, in particular can be oriented, at least substantially perpendicularly to the camera surface of the inspection window. In particular, the camera opening is partially or completely arranged in the slanted surface. Preferably, the viewing direction is oriented, in particular can be oriented, at least substantially perpendicularly to the slanted surface. In an advantageously simple embodiment, the acute angle, which the viewing direction encloses with the longitudinal axis, is fixed. Alternatively, the camera unit comprises at least one drive element for changing, in particular pivoting, an angle of the viewing direction relative to the longitudinal axis. The drive element may be provided to move, in particular to pivot, the camera element relative to the housing unit or to move, in particular to pivot, a reflective optical element. The reflective optical element is preferably a mirror, in particular a micromirror actuator. In an embodiment of the camera unit having the drive element for changing the viewing direction, an angular range adjustable with the drive element for the angle between the viewing direction and the longitudinal axis preferably also includes an orientation of the viewing direction parallel to the longitudinal axis and/or optionally an orientation of the viewing direction perpendicular to the longitudinal axis. Alternatively, the viewing direction of the camera unit is oriented, in particular fixedly, at least substantially in parallel or at least substantially perpendicularly to the longitudinal axis. As a result of the embodiment according to the disclosure, the examination object can advantageously be examined in detail.

It is furthermore proposed that the sensor device comprises a mounting plate, in particular the already mentioned printed circuit board, which is arranged in the housing unit and on which at least the camera unit is mounted, wherein the illumination unit comprises at least one illumination element, in particular the illumination element already mentioned, the already mentioned further illumination element or an additional illumination element, which is arranged on a side of the mounting plate facing away from the camera unit. In the following, this illumination element is referred to as the rearward illumination element. The camera unit, in particular the at least one camera element, is preferably arranged facing the front housing portion. The rearward illumination element is preferably arranged facing the rear housing portion. The rearward illumination element is in particular designed as an LED or OLED. Preferably, the rearward illumination element has a main emission direction which is at least substantially parallel to a surface of the mounting plate on which the rearward illumination element is mounted. The main emission direction of the rearward illumination element is preferably transverse, in particular perpendicular, to the longitudinal axis. In particular, the housing unit comprises a rearward illumination opening, in particular the illumination opening or an additional illumination opening, through which light from the rearward illumination element can be radiated out of the housing unit. The rearward illumination element is provided in particular to indirectly illuminate the examination object. As a result of the embodiment according to the disclosure, direct reflections on the examination object, which can lead to overexposure of the camera unit, can be advantageously avoided.

It is furthermore proposed that the housing unit forms at least one light guide which leads away from the illumination unit in parallel or transversely to the longitudinal axis. The housing unit comprises the light guide in particular instead of the further protective window. For example, the light guide is designed as an optical waveguide or as a planar optical waveguide structure (POWG). The light guide is in particular inserted in the illumination opening. As a result of the embodiment according to the disclosure, the further inspection window can advantageously be omitted. In particular, the illumination opening can advantageously be kept small. In particular, a risk of foreign objects and/or dirt penetrating into the illumination opening can advantageously be kept small.

Furthermore, it is proposed that the sensor device comprises at least one orientation sensor for determining a spatial orientation of the camera unit. The orientation sensor is preferably arranged within the housing unit. Alternatively, the orientation sensor is integrated into the cable unit of the inspection camera. The orientation sensor is preferably designed as an inertial measurement unit (IMU), which preferably comprises rotation rate sensors and/or acceleration sensors. The orientation sensor is preferably provided to detect an orientation of the housing unit, in particular of the camera unit, relative to gravity. The orientation sensor is in particular provided to associate orientation information, which indicates an orientation of the examination object relative to gravity, with an image, captured by the camera unit, of the examination object. Processing of the image captured by the camera unit and of the orientation information detected by the orientation sensor is preferably performed by an external computing unit, in particular a computing unit of the inspection camera, which is arranged outside the housing unit. Alternatively, the sensor device comprises a computing unit which is arranged in the housing unit and links the image and the orientation information to one another. For example, the orientation information may be stored and/in particular output together with the image by means of a marking, for example in the form of an arrow, of a coordinate system or the like, within the image, or may in particular be used by the computing unit to rotate the image to a standard orientation, in particular to automatically adapt it to an orientation of a display for presenting the image. As a result of the embodiment according to the disclosure, an image of the examination object captured by the camera unit can advantageously be interpreted easily. In particular, points of interest of the examination object can advantageously be easily located. In particular, the sensor device can advantageously be intuitively navigated in the examination object.

In addition, an inspection camera, in particular an endoscope, having at least one sensor device according to the disclosure and having at least one power source, arranged at a distance from the housing unit, for supplying electrical power to the camera unit and/or the illumination unit is proposed. The inspection camera in particular comprises an operating unit, the already mentioned cable unit, and the sensor device. In particular, the sensor device is connected to the operating unit via the cable unit, in particular only via the cable unit. The operating unit in particular comprises an operating housing in which the power source is arranged. The operating housing can preferably be held by hand, in particular by one hand, and in particular without aids. The operating unit preferably comprises an output unit. The output unit preferably comprises a display for representing the image captured by the camera unit and/or the orientation information detected by the orientation sensor. The output unit is in particular inserted in the operating housing. Preferably, the operating unit comprises the already mentioned computing unit. The term "computing unit" is understood in particular to mean a unit having an information input, information processing, and an information output. Advantageously, the computing unit comprises at least one processor, a memory, input and output means, further electrical components, an operating program, regulating routines, control routines, and/or calculation routines. Preferably, the components of the computing unit are arranged on a common board and/or advantageously arranged in a common housing. The cable unit in particular comprises at least one power line connecting the camera unit and/or the illumination unit to the power source. The power source is preferably designed as an accumulator or battery. Alternatively, the power source is designed as a power connection, in particular for connecting to an external power grid. The operating unit preferably comprises at least one operating element, in particular at least for switching the sensor device on and/or off. Preferably, the cable unit comprises at least one data line connecting the camera unit and/or the orientation sensor to the computing unit. The cable unit in particular comprises a jacket in which the power line and the data line of the cable unit are arranged together. The jacket is preferably designed as a hose, in particular a strip-wound hose or a corrugated hose, made of metal or plastic. Preferably, the cable unit, in particular in an unwound state, has a greater, in particular more than five times greater, preferably more than ten times greater, particularly preferably more than twenty times greater, maximum longitudinal extension than the sensor device. As a result of the embodiment according to the disclosure, an inspection camera can be provided, which is advantageously easy to handle.

The sensor device according to the disclosure and/or the inspection camera according to the disclosure is/are not to be limited to the above-described application and embodiment. In order to fulfill a functionality described herein, the sensor device according to the disclosure and/or the inspection camera according to the disclosure can in particular comprise a number of individual elements, components, and units that deviates from a number mentioned herein. Moreover, in the case of the value ranges specified in this disclosure, values within the mentioned limits are also to be considered as disclosed and usable as desired.

BRIEF DESCRIPTION OF THE DRAWINGS

Further advantages become apparent from the following description of the drawings. Five exemplary embodiments of the disclosure are illustrated in the drawings. The drawing, the description and the claims contain numerous features in combination. The person skilled in the art will expediently also consider the features individually and combine them into meaningful further combinations.
Shown are.

DETAILED DESCRIPTION

Figure 1:
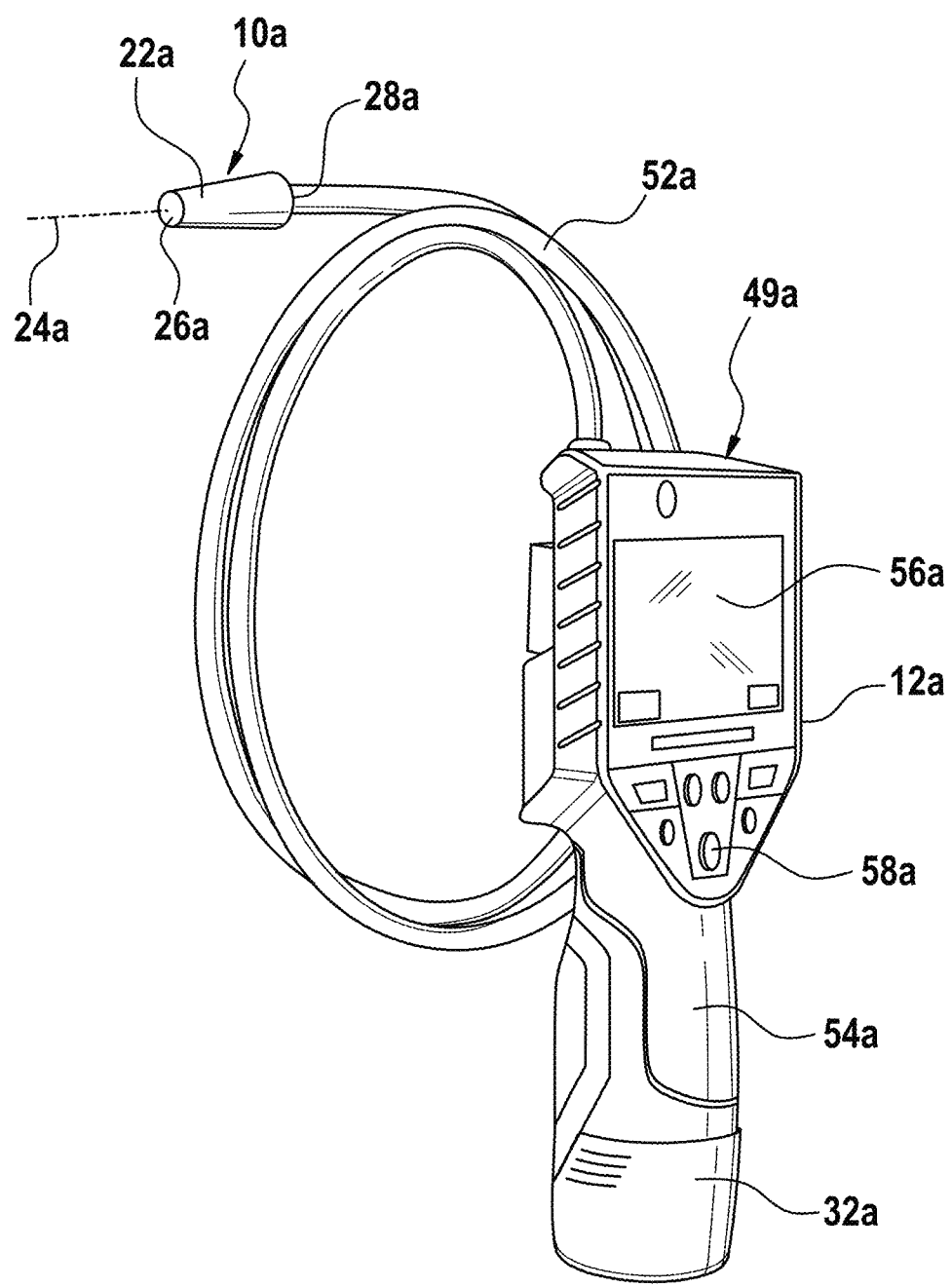
FIG. 1 a schematic diagram of an inspection camera according to the disclosure,
FIG. 2 a schematic diagram of a sensor device according to the disclosure,
FIG. 3 a schematic diagram of a further embodiment of a sensor device according to the disclosure,
FIG. 4 a schematic diagram of an embodiment of a sensor device according to the disclosure having a tapering on both sides, FIG. 5 a schematic diagram of an alternative embodiment of a sensor device according to the disclosure, and FIG. 6 a schematic diagram of an embodiment of a sensor device according to the disclosure having an asymmetrical taper.

FIG. 1 shows an inspection camera 12a, in particular an endoscope. The inspection camera 12a comprises at least one sensor device 10a having a camera unit 20a (see FIG. 2). The sensor device 10a comprises a housing unit 22a. The camera unit 20a of the sensor device 10a is arranged in the housing unit 22a. The inspection camera 12a in particular comprises an operating unit 49a. Preferably, the inspection camera 12a comprises at least one cable unit 52a. The sensor device 10a is in particular arranged at one end of the cable unit 52a. The operating unit 49a is preferably arranged at an end of the cable unit 52a, said end in particular facing away from the sensor device 10a. The operating unit 49a comprises a power source 32a. The power source 32a is in particular designed as an accumulator. The operating unit 49a in particular comprises a handle 54a in which the power source 32a is arranged. The power source 32a is arranged on the sensor device 10a at a distance from the housing unit 22a. The power source 32a is provided to supply power to the sensor device 10a, in particular to the camera unit 20a. The operating unit 49a preferably comprises an output unit 56a, in particular a display. The output unit 56a is preferably provided to output an image captured by the camera unit 20a. The operating unit 49a comprises at least one operating element 58a for operating the sensor device 10a and/or the operating unit 49a, e.g., for storing a single image captured by the camera unit 20a, for switching the camera unit 20a on and/or off, or the like.

Figure 2:
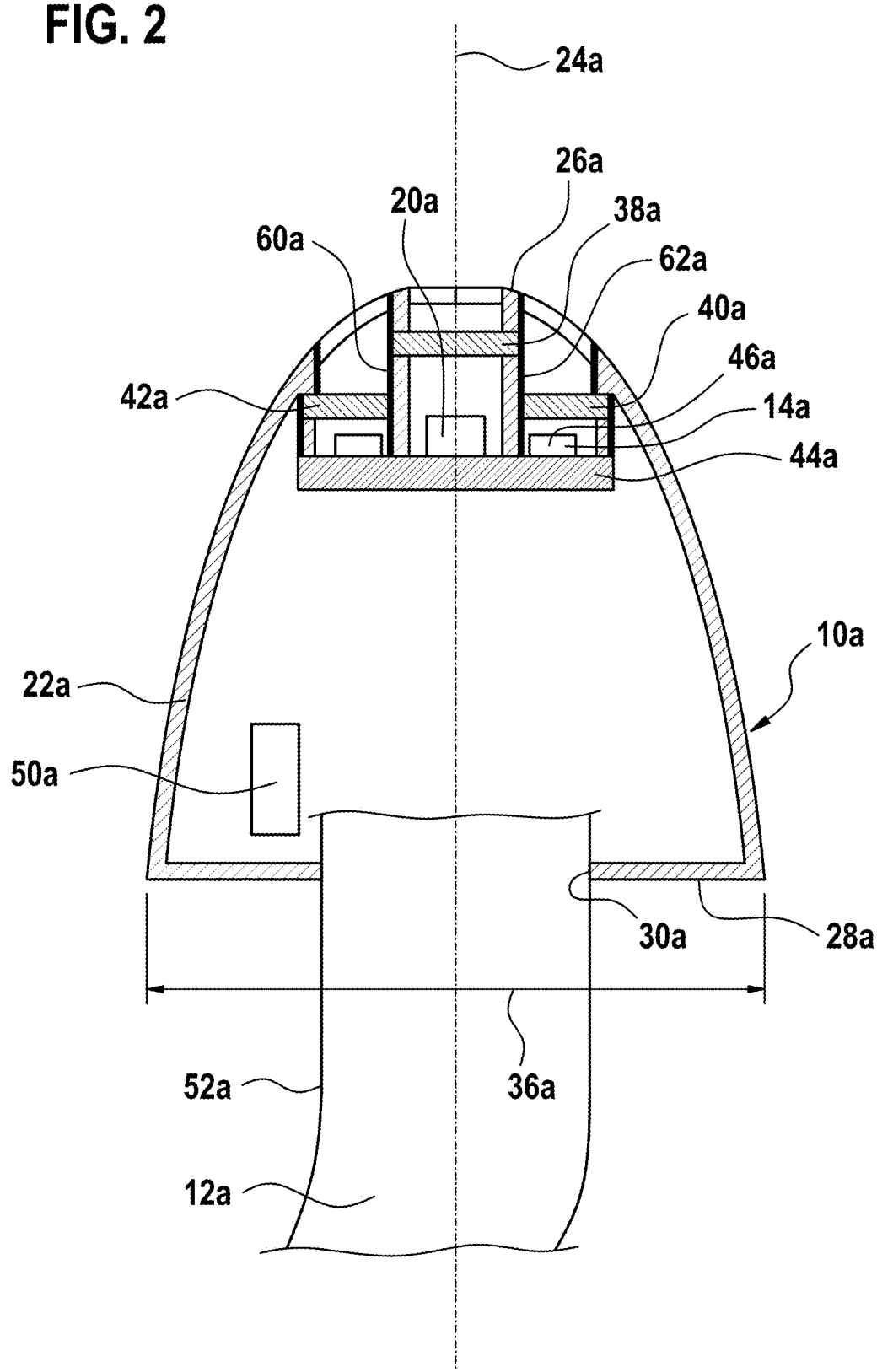

FIG. 2 shows the sensor device 10a. The sensor device 10a comprises at least one illumination unit 14a. The illumination unit 14a is provided to illuminate an examination object. The sensor device 10a comprises the camera unit 20a. The camera unit 20a is provided to detect the examination object. The sensor device 10a comprises the housing unit 22a. The camera unit 20a and the illumination unit 14a are arranged in the housing unit 22a. The housing unit 22a is designed to taper along a longitudinal axis 24a of the housing unit 22a.

With respect to the longitudinal axis 24a, the housing unit 22a comprises a front housing portion 26a and a rear housing portion 28a. The housing unit 22a comprises a cable pass-through 30a arranged on the rear housing portion 28a. The cable pass-through 30a is provided to connect the camera unit 20a and/or the illumination unit 14a to the power source 32a of the inspection camera 12a. In particular, the cable pass-through 30a is provided to receive the cable unit 52a, in particular at least one data line and/or at least one power line of the cable unit 52a. The front housing portion 26a is designed to taper along the longitudinal axis 24a in a direction facing away from the rear housing portion 28a. In particular, the housing unit 22a is designed to taper over an entire length of the housing unit 22a in parallel to the longitudinal axis 24a. By way of example, the housing unit 22a is rotationally paraboloidal. In particular, an apex of a parabola describing an outer wall of the housing unit 22a is arranged in the front housing portion 26a. A maximum transverse extension 36a of the housing unit 22a perpendicular to the longitudinal axis 24a is in particular arranged in one plane with the cable pass-through 30a.

The sensor device 10a in particular comprises a mounting plate 44a, in particular a printed circuit board, which is arranged in the housing unit 22a and on which at least the camera unit 20a is mounted. The illumination unit 14a preferably comprises at least one illumination element 46a, in particular an LED. Preferably, the illumination unit 14a comprises a plurality of illumination elements 46a, which are arranged in the shape of a circle, in particular at regular intervals, around a viewing direction of the camera unit 20a. The at least one illumination element 46a is arranged on the mounting plate 44a, in particular on the same side of the mounting plate 44a as the camera unit 20a. A viewing direction of the camera unit 20a is in particular oriented in parallel to, in particular coaxially with, the longitudinal axis 24a. The sensor device 10a comprises at least one protective window 38a, closing the housing unit 22a, for protecting the camera unit 20a. The sensor device 10a comprises at least one further protective window 40a, 42a, closing the housing unit 22a, for protecting the illumination unit 14a. The protective window 38a and the further protective window 40a, 42a are formed separately from one another. The protective window 38a and the further protective window 40a, 42a are arranged at an offset from one another in a direction parallel to the longitudinal axis 24a. In particular, the housing unit 22a forms at least one blocking element 60a, 62a, which is arranged on a side wall of the protective window 38a and/or of the further protective window 40a, 42a. Preferably, the blocking element 60a, 62a extends in particular from an outer wall of the housing unit 22a to the mounting plate 44a.

The sensor device 10a comprises an orientation sensor 50a for determining a spatial orientation of the camera unit 20a. The orientation sensor 50a is in particular arranged within the housing unit 22a.

FIGS. 3 to 6 show four further exemplary embodiments of the disclosure. The following descriptions and the drawings are substantially limited to the differences between the exemplary embodiments, wherein reference can basically also be made to the drawings and/or the description of the other exemplary embodiments, in particular of FIGS. 1 to 2, with respect to identically designated components, in particular with respect to components having the same reference signs. In order to distinguish the exemplary embodiments, the letter a is added to the reference signs of the exemplary embodiment in FIGS. 1 to 2. In the exemplary embodiments of FIGS. 3 to 6, the letter a is replaced by letters b to e.

Figure 3:
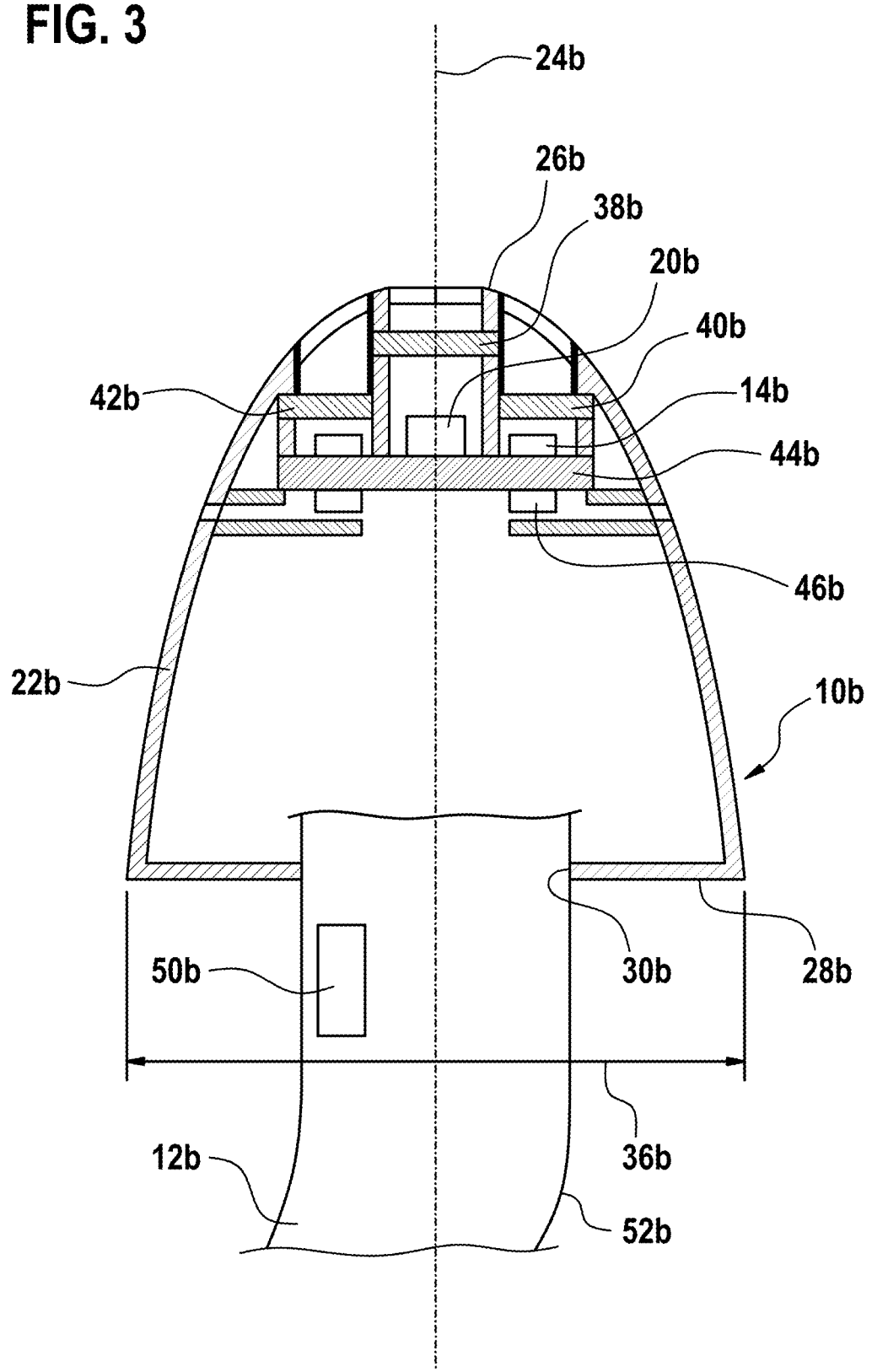

FIG. 3 shows a sensor device 10b for an inspection camera 12b. The sensor device 10b comprises at least one illumination unit 14b. The illumination unit 14b is provided to illuminate an examination object. The sensor device 10b comprises a camera unit 20b. The camera unit 20b is provided to detect the examination object. The sensor device 10b comprises a housing unit 22b. The camera unit 20b and the illumination unit 14b are arranged in the housing unit 22b. The housing unit 22b is designed to taper along a longitudinal axis 24b of the housing unit 22b. The sensor device 10b comprises a mounting plate 44b, in particular a printed circuit board, arranged in the housing unit 22b. At least the camera unit 20b is mounted on the mounting plate 44b. The illumination unit 14b comprises at least one illumination element 46b arranged on a side of the mounting plate 44b facing away from the camera unit 20b.

The sensor device 10b comprises an orientation sensor 50b for determining a spatial orientation of the camera unit 20b. The orientation sensor 50b is in particular integrated into a cable unit 52b of the inspection camera 12b. Preferably, the orientation sensor 50b is arranged less far from the housing unit 22b at or in the cable unit 52b than a maximum longitudinal extension of the housing unit 22b parallel to the longitudinal axis 24b.

With respect to further features of the sensor device 10b, reference is made in particular to FIGS. 1 to 2 and their description.

Figure 4:
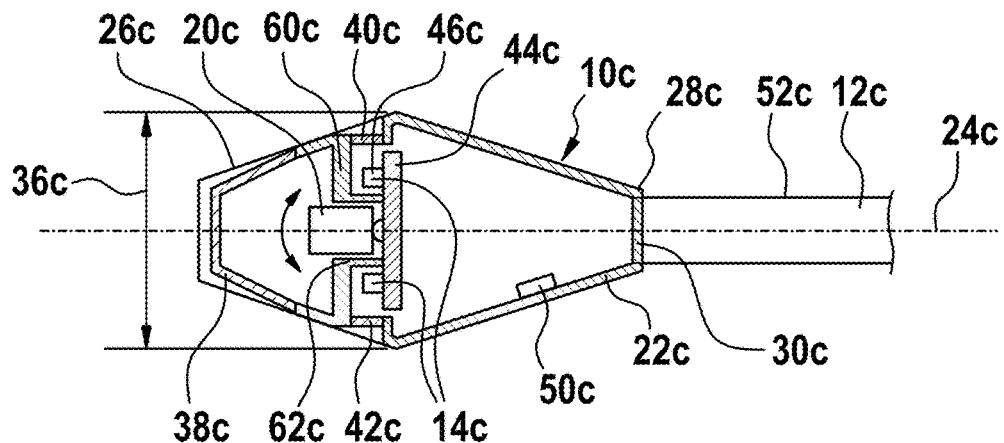

FIG. 4 shows a sensor device 10c for an inspection camera 12c. The sensor device 10c comprises at least one illumination unit 14c. The illumination unit 14c is provided to illuminate an examination object. The sensor device 10c comprises a camera unit 20c. The camera unit 20c is provided to detect the examination object. The sensor device 10c comprises a housing unit 22c. The camera unit 20c and the illumination unit 14c are arranged in the housing unit 22c. The housing unit 22c is designed to taper along a longitudinal axis 24c of the housing unit 22c. With respect to the longitudinal axis 24c, the housing unit 22c comprises a front housing portion 26c and a rear housing portion 28c. The housing unit 22c comprises a cable pass-through 30c, arranged on the rear housing portion 28c, for connecting the camera unit 20c and/or the illumination unit 14c to a power source of the inspection camera 12c. The rear housing portion 28c is designed to taper along the longitudinal axis 24c in a direction facing away from the front housing portion 26c. The front housing portion 26c is designed to taper along the longitudinal axis 24c in a direction facing away from the rear housing portion 28c. In particular, the housing unit 22c has a diamond-shaped cross section in a plane parallel to the longitudinal axis 24c.

A viewing direction of the camera unit 20c is oriented at an acute angle, in particular an adjustable acute angle, to the longitudinal axis 24c in order to detect the examination object through a slanted surface of the housing unit 22c tapering the housing unit 22c. In particular, the camera unit 20c comprises at least one pivotably mounted camera element and a drive element for moving the camera element relative to the longitudinal axis 24c.

With respect to further features of the sensor device 10c, reference is made in particular to FIGS. 1 to 3 and their description.

Figure 5:
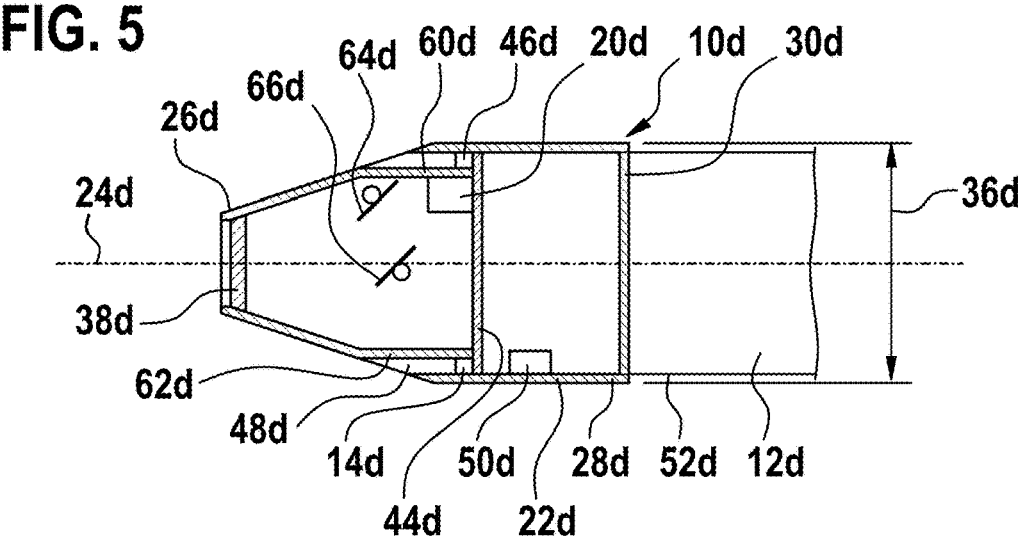

FIG. 5 shows a sensor device 10d for an inspection camera 12d. The sensor device 10d comprises at least one illumination unit 14d. The illumination unit 14d is provided to illuminate an examination object. The sensor device 10d comprises a camera unit 20d. The camera unit 20d is provided to detect the examination object. The sensor device 10d comprises a housing unit 22d. The camera unit 20d and the illumination unit 14d are arranged in the housing unit 22d. The housing unit 22d is designed to taper along a longitudinal axis 24d of the housing unit 22d. The housing unit 22d forms at least one light guide 48d, which leads away from the illumination unit 14d in parallel or transversely to the longitudinal axis 24d.

A viewing direction of the camera unit 20d is oriented at an acute angle, in particular an adjustable acute angle, to the longitudinal axis 24d. In particular, the camera unit 20d comprises at least one micromirror actuator 64d, 66d for tilting the viewing direction relative to the longitudinal axis 24d.

In a plane perpendicular to the longitudinal axis 24d, an edge of the housing unit 22d delimiting a cable pass-through 30d of the housing unit 22d has a maximum transverse extension 36d of the housing unit 22d perpendicular to the longitudinal axis 24d. In particular, the housing unit 22d and a cable unit 52d of the inspection camera 12d are flush with one another in a direction transverse to the longitudinal axis 24d.

With respect to further features of the sensor device 10d, reference is made in particular to FIGS. 1 to 4 and their description.

Figure 6:
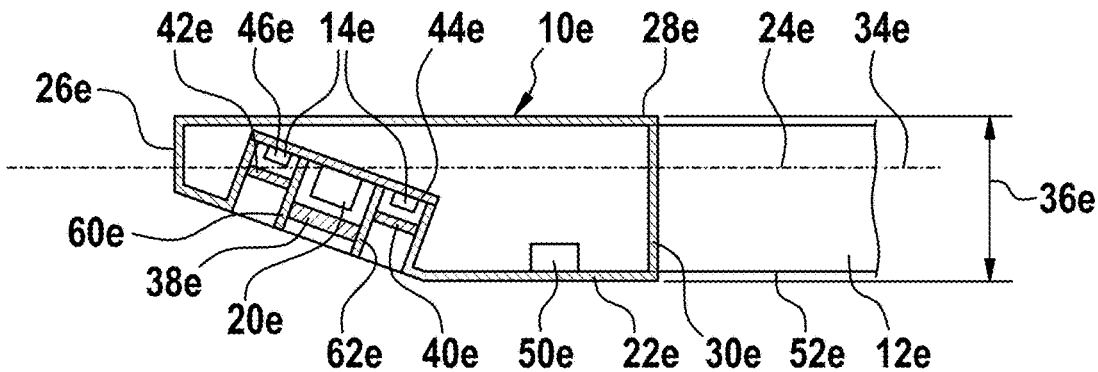

FIG. 6 shows a sensor device 10e for an inspection camera 12e. The sensor device 10e comprises at least one illumination unit 14e. The illumination unit 14e is provided to illuminate an examination object. The sensor device 10e comprises a camera unit 20e. The camera unit 20e is provided to detect the examination object. The sensor device 10e comprises a housing unit 22e. The camera unit 20e and the illumination unit 14e are arranged in the housing unit 22e. The housing unit 22e is designed to taper along a longitudinal axis 24e of the housing unit 22e. The housing unit 22e is asymmetrical with respect to a center plane 34e that is parallel to the longitudinal axis 24e and goes through a geometric center of gravity of the housing unit 22e. A viewing direction of the camera unit 20e is oriented at a defined acute angle to the longitudinal axis 24e in order to detect the examination object through a slanted surface of the housing unit 22e tapering the housing unit 22e.

With respect to further features of the sensor device 10e, reference is made in particular to FIGS. 1 to 5 and their description.

What is claimed is:

1. A sensor device for an inspection camera, comprising:
   at least one illumination unit comprising at least one illumination element configured to illuminate an examination object;
   at least one camera unit configured to detect the examination object;
   at least one housing unit in which the camera unit and the illumination unit are arranged; and
   a mounting plate arranged in the housing unit and on which at least the camera unit and the at least one illumination element is mounted,
   wherein the housing unit defines a longitudinal axis, and
   wherein the housing unit is configured to taper along the longitudinal axis.

2. The sensor device according to claim 1, wherein:
   with respect to the longitudinal axis, the housing unit includes a front housing portion and a rear housing portion,
   the inspection camera includes a power source,
   the housing unit further includes a cable pass-through arranged on the rear housing portion for connecting the camera unit and/or the illumination unit to the power source, and
   the front housing portion is configured to taper along the longitudinal axis in a direction facing away from the rear housing portion.

3. The sensor device according to claim 1, wherein the housing unit is asymmetrical with respect to a center plane that is parallel to the longitudinal axis and extends through a geometric center of gravity of the housing unit.

4. A sensor device for an inspection camera, comprising:
   at least one illumination unit configured to illuminate an examination object;
   at least one camera unit configured to detect the examination object; and
   at least one housing unit in which the camera unit and the illumination unit are arranged, wherein:
   the housing unit defines a longitudinal axis,
   the housing unit is configured to taper along the longitudinal axis, and in a plane perpendicular to the longitudinal axis, an edge of the housing unit delimiting a cable pass-through of the housing unit has a maximum transverse extension of the housing unit perpendicular to the longitudinal axis.

5. The sensor device according to claim 1, wherein:
with respect to the longitudinal axis, the housing unit includes a front housing portion and a rear housing portion,
the inspection camera includes a power source,
the housing unit further includes a cable pass-through arranged on the rear housing portion for connecting the camera unit and/or the illumination unit to the power source,
the rear housing portion is configured to taper along the longitudinal axis in a direction facing away from the front housing portion.

6. The sensor device according to claim 1, further comprising:
at least one protective window closing the housing unit for protecting the camera unit; and
at least one further protective window for protecting the illumination unit,
wherein the protective window and the further protective window are formed separately from one another.

7. The sensor device according to claim 6, wherein the protective window and the further protective window are arranged at an offset in relation to one another in a direction parallel to the longitudinal axis.

8. The sensor device according to claim 1, wherein a viewing direction of the camera unit is oriented at an acute angle in relation to the longitudinal axis in order to detect the examination object through a slanted surface of the housing unit tapering the housing unit.

9. The sensor device according to claim 1, wherein the at least one illumination element is arranged on a side of the mounting plate facing away from the camera unit.

10. The sensor device according to claim 1, wherein the housing unit is configured to form at least one light guide which leads away from the illumination unit in parallel or transversely to the longitudinal axis.

11. A sensor device for an inspection camera, comprising:
at least one illumination unit configured to illuminate an examination object;
at least one camera unit configured to detect the examination object;
at least one housing unit in which the camera unit and the illumination unit are arranged; and
at least one orientation sensor configured to determine a spatial orientation of the camera unit,
wherein the housing unit defines a longitudinal axis, and
wherein the housing unit is configured to taper along the longitudinal axis.

12. An inspection camera, comprising:
at least one sensor device according to claim 1; and
at least one power source arranged at a distance from the housing unit,
wherein the at least one power source is configured to supply electrical power to the camera unit and/or the illumination unit.

13. The sensor device according to claim 1, wherein:
the sensor device is a sensor head, and
the inspection camera is an endoscope.

14. The sensor device according to claim 1, wherein a viewing direction of the camera unit is oriented at an adjustable acute angle in relation to the longitudinal axis in order to detect the examination object through a slanted surface of the housing unit tapering the housing unit.

15. The sensor device according to claim 1, wherein the mounting plate is a printed circuit board.

16. The inspection camera according to claim 11, wherein the inspection camera is an endoscope.

* * * * *